(12) United States Patent
Giménez Pallarès et al.

(10) Patent No.: US 10,822,825 B2
(45) Date of Patent: Nov. 3, 2020

(54) OPERATING PROTEAN WATER INSTALLATION DEVICES

(71) Applicant: Fluidra, S.A., Sabadell (ES)

(72) Inventors: David Giménez Pallarès, Sabadell (ES); Daniel Bujalance Coll, Viladecavalls (ES); Domènec Melendo Casado, Manresa (ES); Òscar Penelo Arias, Viladecavalls (ES)

(73) Assignee: FLUIDRA, S.A., Sabadell (ES)

( * ) Notice: Subject to any disclaimer, the term of this patent is extended or adjusted under 35 U.S.C. 154(b) by 149 days.

(21) Appl. No.: 16/148,370

(22) Filed: Oct. 1, 2018

(65) Prior Publication Data
US 2019/0032353 A1     Jan. 31, 2019

Related U.S. Application Data

(63) Continuation of application No. PCT/EP2016/057545, filed on Apr. 6, 2016.

(51) Int. Cl.
*E04H 4/12*    (2006.01)
*E04H 4/00*    (2006.01)
*G05B 19/042*  (2006.01)

(52) U.S. Cl.
CPC .............. *E04H 4/1281* (2013.01); *E04H 4/00* (2013.01); *G05B 19/042* (2013.01); *G05B 2219/2625* (2013.01)

(58) Field of Classification Search
CPC .......... G05B 2219/2625; G05B 19/042; E04H 4/00; E04H 4/1281
See application file for complete search history.

(56) References Cited

U.S. PATENT DOCUMENTS 7,542,759 B2   6/2009  Edwards et al.
7,587,481 B1   9/2009  Osburn, III
(Continued)

FOREIGN PATENT DOCUMENTS

CN   103955175 A    7/2014
EP     2180390 A2   4/2010
WO  2010062724 A2   6/2010

OTHER PUBLICATIONS

International Written Opinion in corresponding International App. No. PCT/EP2016/057545, dated Dec. 12, 2016.
(Continued)

*Primary Examiner* — Shogo Sasaki
(74) *Attorney, Agent, or Firm* — Kilpatrick Townsend & Stockton LLP; Dean W. Russell

(57) ABSTRACT

Methods and devices for operating protean water installation devices connected to water installation controlling apparatuses and comprising two or more water installation device profiles, wherein only one of the water installation device profiles is enabled at any given time are disclosed. Family descriptor files are associated with the protean water installation devices and with two or more virtual descriptor files. Each virtual descriptor file is associated with one water installation device profile of the water installation device; a registry location indicating the enabled water installation device profile is read at the protean water installation device and a virtual descriptor file, associated with the identified water installation device profile, is executed to operate the water installation device.

15 Claims, 6 Drawing Sheets

(56) References Cited

U.S. PATENT DOCUMENTS

| | | | |
|---|---|---|---|
| 7,992,002 B2 * | 8/2011 | Bradbury | G06F 21/6245 380/201 |
| 8,230,415 B1 | 7/2012 | Thomas | |
| 8,316,135 B2 * | 11/2012 | Ford | H04L 67/025 709/227 |
| 8,495,618 B1 * | 7/2013 | Inbaraj | G06F 8/654 717/173 |
| 8,649,909 B1 | 2/2014 | Phillips | |
| 8,745,746 B1 * | 6/2014 | Jain | H04L 63/145 726/25 |
| 9,400,642 B2 | 7/2016 | Thomas et al. | |
| 9,417,862 B2 | 8/2016 | Homma | |
| 9,513,893 B2 | 12/2016 | Rothrock et al. | |
| 9,535,681 B2 | 1/2017 | Chan | |
| 2002/0161685 A1 * | 10/2002 | Dwinnell | G06Q 40/06 705/36 R |
| 2002/0184619 A1 | 12/2002 | Meyerson | |
| 2003/0143952 A1 | 7/2003 | Haller et al. | |
| 2004/0054995 A1 | 3/2004 | Lee | |
| 2004/0103411 A1 | 5/2004 | Thayer | |
| 2005/0055684 A1 | 3/2005 | Rao et al. | |
| 2005/0159911 A1 | 7/2005 | Merritt et al. | |
| 2006/0025875 A1 | 2/2006 | Smith et al. | |
| 2006/0248162 A1 | 11/2006 | Kawasaki | |
| 2007/0130160 A1 | 6/2007 | Choe et al. | |
| 2007/0243900 A1 | 10/2007 | Edwards et al. | |
| 2007/0245335 A1 | 10/2007 | Minagawa et al. | |
| 2008/0086222 A1 | 4/2008 | Kagan | |
| 2008/0163227 A1 | 7/2008 | Son et al. | |
| 2009/0216345 A1 | 8/2009 | Christfort | |
| 2009/0235244 A1 | 9/2009 | Enomori et al. | |
| 2010/0037216 A1 | 2/2010 | Carcerano et al. | |
| 2010/0249956 A1 | 9/2010 | Bliss et al. | |
| 2011/0004678 A1 | 1/2011 | Rothrock | |
| 2011/0202185 A1 | 8/2011 | Imes et al. | |
| 2012/0099024 A1 * | 4/2012 | Ryu | H04N 21/4586 348/730 |
| 2012/0167185 A1 * | 6/2012 | Menezes | H04L 63/0815 726/5 |
| 2012/0316658 A1 * | 12/2012 | Glew | H04L 67/025 700/1 |
| 2013/0079936 A1 | 3/2013 | Cullen et al. | |
| 2014/0058537 A1 | 2/2014 | Jost | |
| 2014/0222241 A1 | 8/2014 | Ols | |
| 2014/0223423 A1 | 8/2014 | Alsina et al. | |
| 2014/0237130 A1 * | 8/2014 | Chan | H04L 67/10 709/228 |
| 2015/0058834 A1 | 2/2015 | Chan | |
| 2015/0067665 A1 | 3/2015 | Thomas et al. | |
| 2015/0067667 A1 | 3/2015 | Chan | |
| 2015/0095335 A1 | 4/2015 | Reyes et al. | |
| 2015/0355894 A1 * | 12/2015 | Hayami | G06F 9/44526 717/174 |
| 2016/0034263 A1 | 2/2016 | Homma | |
| 2017/0039372 A1 | 2/2017 | Koval et al. | |
| 2017/0068531 A1 | 3/2017 | Ech-Chergui et al. | |

OTHER PUBLICATIONS

International Search Report in corresponding International App. No. PCT/EP2016/057545, dated Dec. 12, 2016.

* cited by examiner

```
401    <virtual_drivers>
402      <component>0</component>

403a     <virtual_driver id="0">
404a       <driver_name>VirtualDriver0.xml</driver_name>
405a       <id_product_code>0x0000FFFF</id_product_code>
406a       <manufacturer_id>0x00000000</manufacturer_id>
407a       <sw_version>0x0000</sw_version>
         </virtual_driver>

403b     <virtual_driver id="1">
404b       <driver_name>VirtualDriver1.xml</driver_name>
405b       <id_product_code>0x0000DDDD</id_product_code>
406b       <manufacturer_id>0x00000000</manufacturer_id>
407b       <sw_version>0x0000</sw_version>
         </virtual_driver>
       </virtual_drivers>
```

Fig. 4a

| | |
|---|---|
| 410 | `<device_attributes>` |
| 411 | `<id_product_code_list>` |
| 412 | `<id_product_code>0x0008131E</id_product_code>` |
| | `</id_product_code_list>` |
| 413 | `<sw_version_list>` |
| 414 | `<sw_version>0x00C8</sw_version>` |
| | `</sw_version_list>` |
| 415 | `<manufacturer_list>` |
| 416 | `<manufacturer_id>0x3B8BA51F</manufacturer_id>` |
| | `</manufacturer_list>` |
| | `</device_attributes>` |

Fig. 4b

| | |
|---|---|
| 420 | `<components>` |
| 421 | `<component id="0">` |
| 422 | `<component_name>FunctionMode</component_name>` |
| 423 | `<modbus_read_function>0x04</modbus_read_function>` |
| 424 | `<modbus_read_address>0x0000</modbus_read_address>` |
| 425 | `<modbus_mask>0x0002</modbus_mask>` |
| | `</component>` |
| | `</components>` |

OPERATING PROTEAN WATER INSTALLATION DEVICES

CROSS-REFERENCE TO RELATED APPLICATIONS

This application relates to and claims the benefit and priority to International Application No. PCT/EP2016/057545, filed Apr. 6, 2016.

FIELD OF THE INVENTION

The present disclosure relates to water installation devices and more specifically to methods, systems and computer program products for operating protean water installation devices.

BACKGROUND

Water installations, and particularly the ones adapted to be filled with water to enable swimming or other leisure activities such as swimming pools, artificial spas, or to sustain life such as fish farms or the like, require that a number of their parameters is controlled at any given time. For example, in case of swimming pools, the temperature, the quality, the pH or the Oxidation-Reduction Potential (ORP) needs to be monitored and controlled regularly to guarantee proper functioning of the water installation. Typically, these parameters are controlled by use of a water installation controlling apparatus, separate control devices (or water installation devices) that are arranged with the water installation. Example control devices are thermostats, pumps, water purification equipment, pH controllers, ORP controllers etc.

Basically, a water installation controlling apparatus can be defined as an apparatus configured to operate water installation devices through which said apparatus may control different parameters of a water installation.

To perform such controls, different types of software in the water installation controlling apparatus are required. For example, an operating system, controlling software running on the operating system and software for the water installation controlling apparatus operating the water installation devices are required.

There are, however, water installation device types of a varying nature. That is, they may assume different profiles and their function may change as a function of the way they are manufactured, installed or set up. We may call such water installation devices protean water installation devices. For example, a device may comprise multiple functionalities, e.g. the functionality of a pH controller and the functionality of an ORP controller. During setup a setup profile may be selected and, thereafter, the device may assume a pH controller profile and act as a pH controller or assume an ORP controller profile and act as an ORP controller or assume a combination pH/ORP controller profile, whereby both functionalities are activated (pH and ORP). Another such example may be two protean devices that may exhibit different functionality but their only differences may be because of branding or user interface specifications. That is, a generic device may be manufactured to have dual (or multiple) functionality but the brand owner may specify that only one or a combination of the many functionalities is enabled. A further case of a protean device may be a device having the possibility to change its functionality not foreseen from the start.

As a consequence, a water installation controlling apparatus needs to be reconfigured after the protean water installation has assumed its profile e.g. following its setup procedure. This reconfiguration implies that the protean water installation device may not be readily controllable by the water installation controlling apparatus when it is initially installed. It also implies the need for modifications that may require the presence or attention of qualified personnel which, again, makes the process too cumbersome for the end user.

Consequently, there is a need for a software platform that at least partially solves the aforementioned problems.

SUMMARY OF THE DISCLOSURE

Provided is a software platform for operating protean water installation devices that advantageously provides software associated to a water installation device type that may distinguish between various profiles of each water installation device type.

The software for the water installation controlling apparatus may comprise various pieces of software each associated to a water installation device type. The term "software associated to a water installation device type" comprised in the controlling software may be understood as a descriptor file associated to a water installation device type. Thus, in the context of the present disclosure, a descriptor file for a water installation device may be defined as a piece of software based on a code (i.e. instructions) written under a textual data format, i.e. a human-readable and machine readable format. This piece of software may be seen as a descriptor of (i.e. as describing) how the device has to be operated by a (water installation) controlling apparatus and configured by a user (of the water installation).

The water installation controlling apparatus may have a processor configured to execute general purpose software and to process the descriptor file in such a way that the device is operated (by the controlling apparatus) and configured (by a user) in the context of said software of more general purpose. This software of more general purpose may comprise e.g. calls to an interpreter dedicated to interpret and execute the content of the descriptor file. This way, the execution of the general purpose software may cause operation of the device when required by performing necessary functions that are implemented in the descriptor file in a manner which is exclusive for the device. This "exclusive" implementation may depend on e.g. the hardware configuration of the device and other particularities.

Typical descriptor files are associated to a water installation device type and functionality and assume a single functioning profile of each device. To be able to operate a protean water installation device, a water installation controlling apparatus may need to know beforehand which profile (corresponding to a single functionality or combination of functionalities) the protean water installation device will assume after setup which is sometimes impossible to predict. To solve this problem, a new type of descriptor file structure is proposed. The proposed descriptor file structure requires a two-level descriptor file, one to be used at the level of the protean water installation device (generic) and another one at the device profile level (specific).

In a first aspect, a method of operating a protean water installation device is disclosed. The protean water installation device is connected to a water installation controlling apparatus. The protean water installation device comprises two or more water installation device profiles. Only one of the water installation device profiles is enabled at any given time. The method comprises:
- selecting a family descriptor file associated with the protean water installation device. The family descriptor file is associated with two or more virtual descriptor files. Each virtual descriptor file is associated with one water installation device profile of the protean water installation device.
- executing the selected family descriptor file in the water installation controlling apparatus;
- identifying the enabled water installation device profile;
- identifying the virtual descriptor file associated with the identified water installation device profile;
- executing the identified virtual descriptor file to operate the protean water installation device.

The method allows for controlling protean water installation devices without requiring the introduction of changes to the controlling apparatus after the protean device has been set up and its profile has been selected (activated). Furthermore, the control is maintained at the controlling apparatus and there is no need to introduce changes to the protean water installation device. Further to that, if a protean (generic) water installation device demonstrates a new profile in the future it is not required to change (modify or reconfigure) the descriptor files for the same protean devices that have already acquired known profiles. An activated profile may be a profile corresponding to a single functionality or to a combination of functionalities. For example, a protean device may provide two functionalities (e.g. pH and ORP) whereby three profiles may be available (pH only, ORP only, or combination of pH and ORP). In this case the water installation controlling apparatus shall select one from three available virtual descriptor files after identification of the enabled (activated) water installation device profile following.

In some examples, selecting a family descriptor file may further comprise identifying a tag indicating that the selected family descriptor file is associated with two or more virtual descriptor files. This allows for the controlling apparatus to treat descriptor files of protean and non-protean devices in the same way. It may only initiate the virtual descriptor file identification process if the tag exists. Otherwise it may execute the descriptor file as usual.

A descriptor file for a water installation device can contain a code structure similar to the following example schema which can be written in an XML format:

User Interface

Configuration instructions referring to the User Interface to be used for configuring the device
<Configuration Registers>
Register instructions referring to a list of configuration registers of the device to be displayed by the User Interface during configuration of the device
<Alarms>
Register instructions referring to registers of the device to be inspected to detect an alarm of the device
<Pump>
Register instructions referring to registers of the device to be inspected and/or updated to interact with a pump device
<Trigger>
Trigger instructions for triggering the device depending on triggering conditions based on e.g. a timer, the status of another device, etc.
<Data Logging>
Instructions referring to registers of the device to be inspected for obtaining measurements sensed by the device and storing them in a database In the above example schema, only some tags and corresponding instructions have been included. However, many other tags and instructions may be included in other examples of descriptor files, such as e.g. having the function of identifying the device, performing basic functionalities for operating and configuring the device, etc.

Instructions for identifying the water installation device may refer to the code associated with the device, its hardware version, its firmware version, etc. Instructions for performing basic functionalities may refer to e.g. which register of the device has to be updated to activate the device and which content has to be put in the register to select a particular activation mode, which register of the device has to be updated to deactivate the device and which content has to be put in said register, etc.

The configuration instructions associated with the tag <User Interface> may implement (inside the descriptor file) the user interface to be used or may comprise a pointer to an implementation of the user interface (outside the user interface). This pointer may be based on any known mechanism to indicate where the implementation of the user interface is stored. For example, a corresponding path of a file system object or an Internet link may be used as the pointer to the implementation of the user interface.

This pointer may point to e.g. an area of a repository, file system, etc. of user interfaces arranged in the water installation controlling apparatus, or in a server connected with the water installation controlling apparatus, etc. An aspect of using such a pointer may be that a same implementation of the user interface may be used for configuring different devices. This may potentiate reusability of user interfaces, facilitate maintenance of user interfaces, facilitate re-assignment of user interfaces to different devices, etc.

The register instructions of the tag <Configuration Registers> may provide valuable flexibility to the presentation by the user interface of necessary configuration registers during configuration of the water installation device. These register instructions may explicitly indicate (inside the descriptor file) which registers have to be displayed. Alternatively, the configuration register instructions may comprise a pointer to a site or location where the list of configuration registers is stored (outside the descriptor file).

Similar advantages of reusability, easiness of maintenance and/or re-assignment, etc. can be attributed to the above way of referring to lists of configuration registers to be displayed by the user interface during configuration of the device.

The register instructions associated with the tag <Alarms> may be useful for operating the device in such a way that alarm detection is performed. These alarm register instructions may indicate which register or registers have to be inspected for detecting alarms of the device, which value or values have to contain said alarm register(s) for considering that the device is in an alarm situation, etc.

The register instructions of the tag <Pump> may be useful for operating the interaction of the device with a pump device. A pump device may be an important device because pumping of water is normally required in any type of water installation for e.g. renewing the water in a pool, pressure water jets for hydro-massage, etc. Therefore, the implementation of interaction functionalities between a water installation device and a "main" water pump concentrated in a descriptor file may be very useful to facilitate said interaction and its re-adjustment.

The trigger instructions associated with the tag <Triggers> may be useful for operating the device in such a way that activation (or deactivation) of the device is triggered depending on predefined conditions. For example, the trigger instructions may implement the triggering of the device when a timer reaches a predefined time value, or when another device reaches a predetermined status (in terms of e.g. a sensed measurement), etc. These functionalities centralized in a descriptor file may provide advantages similar to the ones described before in terms of reusability, easiness of maintenance and/or re-assignment, etc.

The data logging instructions of the tag <Data Logging> may implement functionalities of obtaining sensed measurements in a device with one or more sensors and storing said measurements in a database of historical data. These instructions may indicate how and from which registers the sensed measurements have to be obtained, under which periodicity, to which database the measurements they have to be stored, etc. The historical data accumulated in the database may be advantageously used for diagnosing improvable performance of the water installation device and accordingly re-adjusting the device in order to improve its performance.

In some examples, executing the selected family descriptor file may comprise executing a software component to read a register of the protean water installation device and identifying the virtual descriptor file in response to said register reading. This allows for the controlling apparatus to have a minimal family descriptor file that may only be used to access said register and acquire (read) the content of the register for the sole purpose of identifying the device profile. Reading the register may comprise identifying a manufacturer identification (ID) of the water installation device, or identifying a functional mode of the water installation device or identifying a version of the water installation device.

In some examples, executing the identified virtual descriptor file may comprise applying a software mask associated with the identified water installation device profile. This allows the function and structure of the descriptor files to be the same for reading from and writing in the register of the protean device which simplifies the structure of the virtual descriptor files.

In some examples the method may further comprise requesting the identified virtual descriptor file from a remote data storage location. This allows for new device profiles to be instantly accessible and operable without the need to previously store all possible device profiles at the controlling apparatus.

In some examples the family descriptor file may comprise the virtual descriptor file. Identifying the virtual descriptor file associated with the identified water installation device profile may then comprise locating the virtual descriptor file within the family descriptor file. This may be useful when a protean has only a few possible alternative profiles. Therefore, all the information of the various profiles may be included in the same family descriptor file, albeit in different locations.

In some examples, operating a water installation device connectable to a water installation controlling apparatus may comprise operating a protean device connectable to a controlling apparatus of a water installation that is filled with water to enable swimming or other leisure activities. Such protean water installation devices may be a device having at least two device profiles, wherein the first device profile may be a pH controller profile and the second device profile may be an Oxidation-Reduction Potential (ORP) controller profile.

In another aspect, a water installation controlling apparatus is disclosed. The water installation controlling apparatus may be configured to operate a protean water installation device connectable to the water installation controlling apparatus. The protean water installation device may comprise two or more water installation device profiles, wherein only one of the water installation device profiles may be enabled at any given time. The water installation controlling apparatus may comprise:

means for selecting a family descriptor file associated with the water installation device, said family descriptor file associated with two or more virtual descriptor files, each virtual descriptor file being associated with one water installation device profile of the water installation device;

means for executing the selected family descriptor file;

means for identifying the enabled water installation device profile;

means for identifying the virtual descriptor file associated with the identified water installation device profile;

means for executing the identified virtual descriptor file to operate the water installation device.

The means may be electronic or computing means used interchangeably, that is, a part of the described means may be electronic means and the other part may be computer means, or all described means may be electronic means or all described means may be computer means. Examples of a system comprising only electronic means may be a CPLD (Complex Programmable Logic Device), an FPGA (Field Programmable Gate Array) or an ASIC (Application-Specific Integrated Circuit).

In yet another aspect, a water installation system is disclosed. The water installation system may comprise a water installation controlling apparatus according to previous aspects herein; and a protean water installation device having two or more water installation device profiles wherein only one of the water installation device profiles is enabled at any given time. The protean water installation device may be connected, e.g. through a communication network, to the water installation controlling apparatus.

The water installation system may further comprise a water installation that is filled with water to enable swimming or other leisure activities such as a swimming pool or the like.

In yet another aspect, a computer program product is disclosed. The computer program product may comprise program instructions for causing a computing system to perform a method of operating a water installation device according to examples disclosed herein. The computing system executing the program instructions may be a part of the water installation controlling apparatus (i.e. a system inside the water installation controlling apparatus configured to reproduce the method described above) or may be the water installation controlling apparatus itself.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

In another aspect, a computing system is disclosed. The computing system may comprise a memory and a processor, embodying instructions stored in the memory and executable by the processor, the instructions comprising functionality to execute a method of operating a protean water installation device according to some examples disclosed herein.

The computing system may be a part of the water installation controlling apparatus (i.e. a computing system inside the water installation controlling apparatus or may be the water installation controlling apparatus itself.

The information exchange between said computing system and the protean water installation device may be performed through a communication network, for example a global communication network such as the Internet. Said communication may be secured by means of, for example, cryptographic keys and/or a SSL tunnel established between the computing system and the protean water installation device.

These and other advantages and features will become apparent in view of the detailed description and drawings.

BRIEF DESCRIPTION OF THE DRAWINGS

Non-limiting examples of the present disclosure will be described in the following, with reference to the appended drawings, in which:

FIG. 4a-4c illustrate the content of an XML file according to some examples.

DETAILED DESCRIPTION

Figure 1:
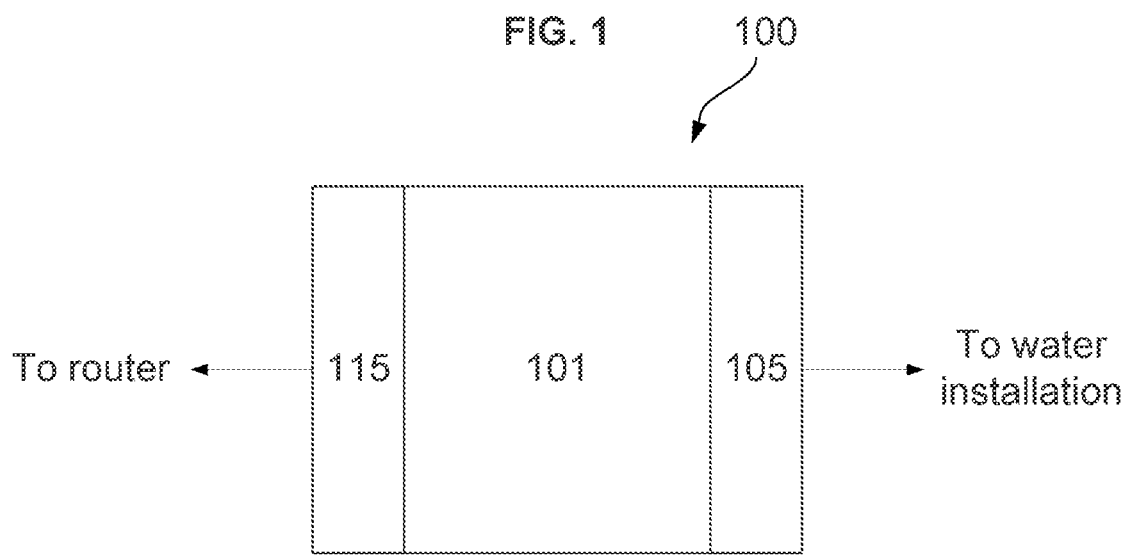
FIG. 1 illustrates a block diagram of a water installation controlling apparatus according to some examples.

FIG. 1 illustrates a block diagram of a water installation controlling apparatus according to some examples. Basically, a water installation controlling apparatus 100 comprises a processing module 101, an interface module 105 for connecting the apparatus to at least one protean water installation device, and a network access module 115 for accessing the apparatus to a communication network, for example a global communication network such as the Internet. The water installation controlling apparatus may communicate with the protean water installation devices using a communication protocol, such as the Modbus serial communication protocol.

The processing module 101 may be implemented by computing means, electronic means or a combination thereof. The computing means may be a set of instructions (that is, a computer program) and then the processing module may comprise a memory and a processor, embodying said set of instructions stored in the memory and executable by the processor, the instructions comprising functionality to execute at least a method of operating a protean water installation device as will disclosed below. In case the processing module 101 is implemented only by electronic means, the processing module may be, for example, a CPLD, an FPGA or an ASIC. In case the processing module 101 is a combination of electronic and computing means, the computing means may be a set of instructions and the electronic means may be any electronic circuit capable of implementing the corresponding step or steps of the cited method.

It is important to highlight that said processing module 101 may be implemented in the water installation controlling apparatus 100 by a system (or by a computing system) comprised in it or connected to it, and configured to specifically perform this method, or may be the water installation controlling apparatus itself as a whole, that is, the same resources (e.g. memory, processor, electronic circuits, etc.) of the water installation controlling apparatus may be configured to perform different tasks (for example, among other tasks, the execution of the cited method).

The interface module 105 may be connectable to one or more protean water installation devices that may exhibit two or more profiles, such as a pH controller profile, an ORP controller profile, a combined profile or the like. The interface module may be configured to be physically connected to the water installation devices via one or more cables or it may be wirelessly connected to a wireless module of the water installation devices. Thus, this interface module may comprise a wired/wireless communication interface, for example, it may be any standard interface such as Bluetooth, Wi-Fi or Ethernet but it is not limited to them.

On the other hand, the network access module 115 may be configured to be connected to a network access point such as a router. The router may be available in the vicinity of the water installation, e.g. in a building housing or being next to the water installation, and may be connected to the communication network such as the Internet. This way, the water installation controlling apparatus 100 may access to the Internet through the network access module 115 connected to the router.

Figure 2:
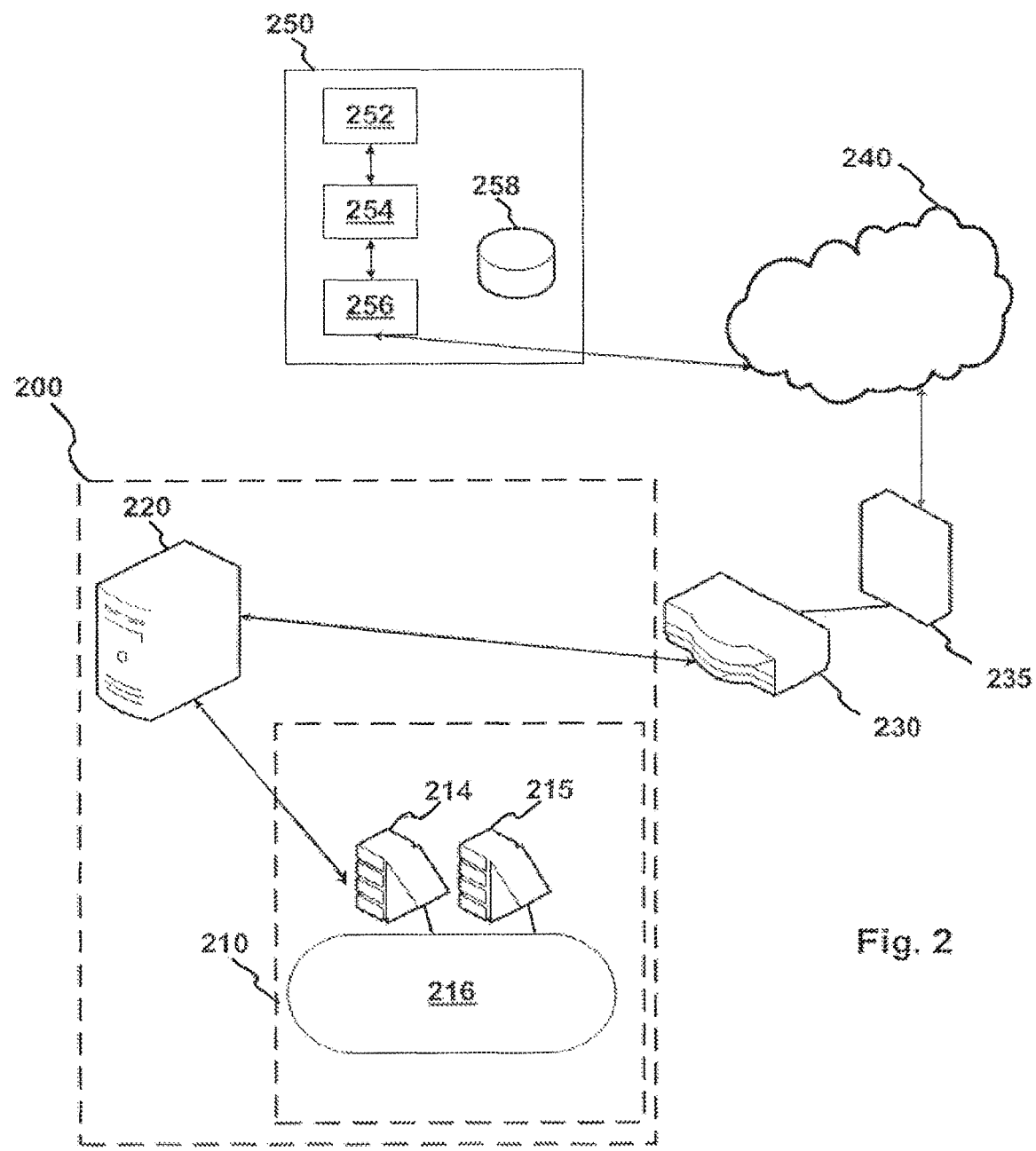
FIG. 2 illustrates a block diagram of a water installation system according to some examples.

FIG. 2 illustrates a block diagram of a water installation system 200 according to some examples. Water installation system 200 comprises a water installation configuration 210 and a water installation controlling apparatus 220. The water installation configuration may comprise a water installation 216 and one or more water installation devices 214, 215. The water installation devices 214, 215 may form part of the water installation 216 or they may be installed with or by the water installation 216. Alternatively, they may be connected to the water installation 216 to control or measure one or more properties of the water installation 216 or of its environment. Water installation device 214 may be a protean water installation device whereas water installation device 215 may be a non-protean water installation device.

The water installation controlling apparatus 220 may be connected through a communication network 240 such as the Internet to a remote server 250. A router 230 may provide access to the communication network 240 for the water installation controlling apparatus 220. The router may be protected by a firewall 235 or not. For that purpose, the remote server 250 may also be connected to the communication network 240 such as the Internet.

The established communication between the remote server 250 and the water installation controlling apparatus 220 may be a secured communication (or a non-secured communication). Said securitization of the communication may be obtained, for example, by means of cryptographic keys (the remote server 250 may comprise its public and private keys and the public key of the water installation controlling apparatus 220 whereas the water installation controlling apparatus may comprise its public and private keys and the public key of the remote server 250) or by means of a SSL tunnel (not shown in FIG. 2) established between the remote server 250 and the water installation controlling apparatus. Consequently, the water installation controlling apparatus and the remote server 250 may be configured to exchange information (data, updates, etc.) between them through the communication network 240, as can be seen in FIG. 2.

Therefore, the proposed solution in FIG. 2 may establish a secure communications gateway via the communication network 240, such as the Internet, to enable bi-directional connections between the remote server 250 and the water installation controlling apparatus 220. As described above, bi-directional communications may be established in a secured and encrypted form so that the information, the remote server 250 and the water installation controlling apparatus 220 are safe from unauthorized access. The communications may be dynamically set regardless of whether the IP addresses of the devices are static or dynamic.

The water installation to which at least one device is associated may be a simple container filled with water to enable swimming or other leisure activities such as swimming pools, artificial spas, or to sustain life such as fish farms or the like. Various independent water installation devices may be used to control aspects of the water installation such as water temperature, lighting, water quantity, water quality etc. Some of the water installation devices may be protean water installation devices having two or more profiles that are selectable upon setup. Other water installation devices may be non-protean, i.e. having a single profile that is merely activated upon setup. The water installation controlling apparatus may be configured to be connected to one or more of such water installation devices.

Concerning the remote server 250, it may basically comprise a processing module 252, a web server 254, a network access module 256 for accessing to the communication network 240, and a repository of data 258 for storing at least the different versions of software packets that may be required by the water installation controlling apparatus 100. Such different versions of software packets may be descriptor files either of the family descriptor file type or of the virtual descriptor file type.

The processing module 252 of the remote server 250 may be implemented by computing means, electronic means or a combination of them. The computing means may be a set of instructions and the processing module 252 may comprise a memory and a processor, embodying said set of instructions stored in the memory and executable by the processor, the instructions comprising functionality to execute a method of providing descriptor files to the water installation controlling apparatus 220 as will disclosed below. In case the processing module 252 is implemented only by electronic means, said processing module may be, for example, a CPLD, an FPGA or an ASIC. In case the processing module 252 is a combination of electronic and computing means, the computing means may be a set of instructions and the electronic means may be any electronic circuit capable of implementing the corresponding step or steps of the cited method.

It is important to highlight that said processing module 252 may be implemented in the remote server 250 by a system (or by a computing system) comprised in it or connected to it, and configured to specifically perform the cited method, or may be the remote server itself as a whole, that is, the same resources (e.g. memory, processor, electronic circuits, etc.) of the remote server may be configured to perform different tasks (for example, among other tasks, the execution of the cited method).

On the other hand, by means of the network access module 256 the remote server 250 may connect, through the cited communication network 240, to the water installation controlling apparatus 220 for exchanging information (data, updates, . . . ) between them. For that purpose and others, the network access module 256 may be configured to be connected to a network access point such as a router (not shown). The router may be available in the vicinity of the remote server and may be connected to the communication network 240. As described above, the established communication between the remote server and the water installation controlling apparatus may be a secure communication. Consequently, the remote server and the water installation controlling apparatus may be configured to exchange information (data, updates, etc.) with the water installation controlling apparatus through the secured communication.

Figure 3:
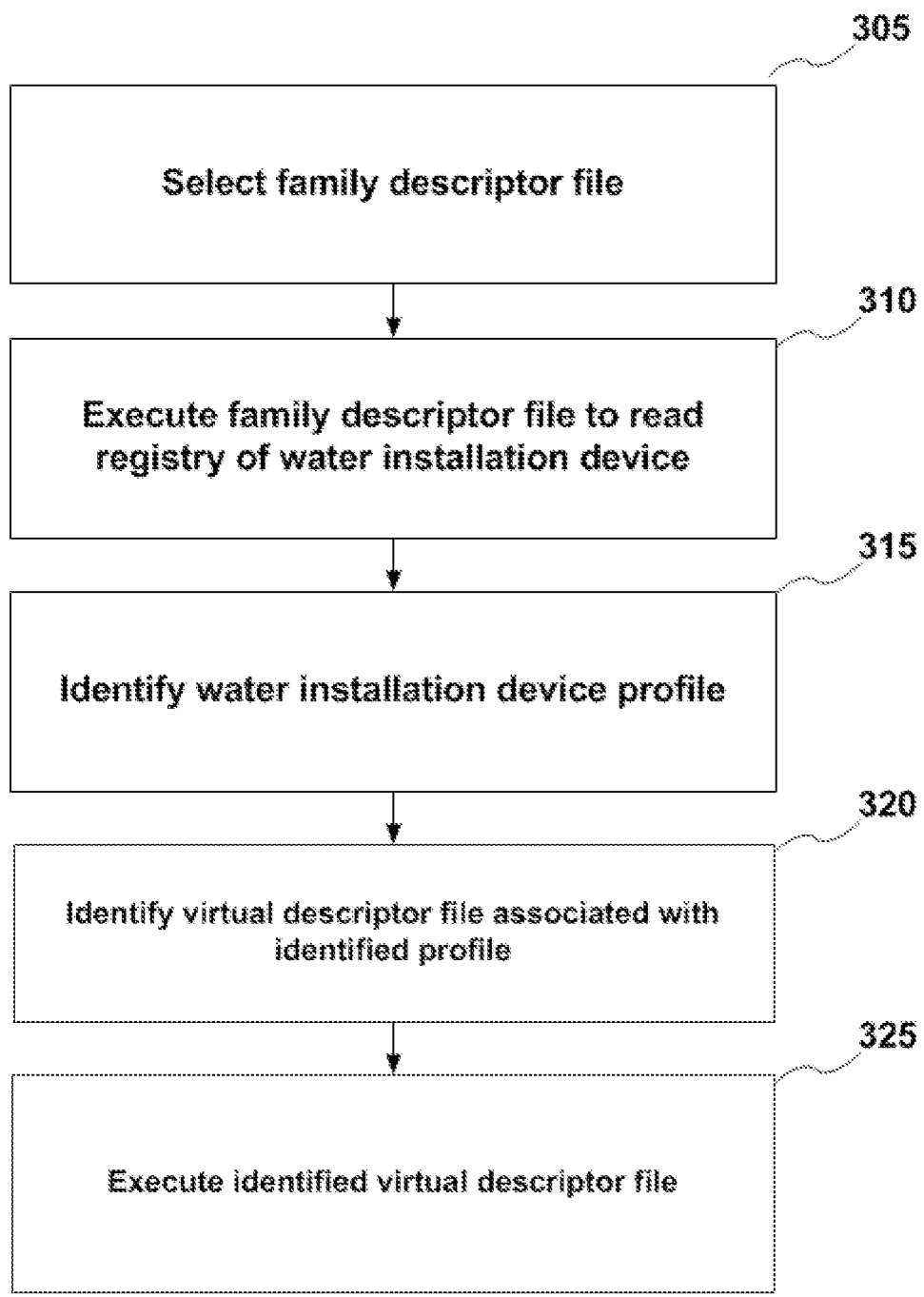
FIG. 3 is a flow diagram of a method of operating a protean water installation device according to some examples.

Following, based on the disclosed water installation system 200 and FIGS. 3 and 4, a method 300 for operating a protean water installation device will be disclosed. A water installation controlling apparatus may communicate with the protean water installation devices using a communication protocol, such as the Modbus serial communication protocol. The water installation controlling apparatus may then act as a master device and the protean water installation device may act as a slave device. The protean water installation device may have, among other Modbus entities, at least a register, such as an input register comprising measurements and statuses. Typical Modbus input registers comprise 16 bits. However, any other size or type of register may be present at the protean water installation device In a first step 305, the water installation controlling apparatus 220 selects a family descriptor file associated with a water installation device. The family descriptor file may be associated with two or more virtual descriptor files. Each virtual descriptor file may be associated with one water installation device profile of the water installation device. The family descriptor file may be comprised in an eXtensible Markup Language (XML) file. An example of this type of files is illustrated in FIGS. 4*a*, 4*b* and 4*c*. FIG. 4*a* illustrates the part of the XML file that includes pieces of code ("tags") related to the virtual drivers. As can be seen in this figure, the file may comprise tags 401, 402, 403, 404, 405, 406 and 407. The first tag ("<virtual_drivers>") is an indication that the descriptor file is a family descriptor file or, viewed from another perspective, that the water installation device associated with the descriptor file is a protean water installation device. If this tag exists then the water installation controlling apparatus needs to execute, in step 310, an action (or function) to read the register of the protean water installation device. Then, in step 315, the water installation controlling apparatus may identify the enabled water installation device profile.

Tag 402 ("<component>0</component>") is read to identify, in step 320, the virtual descriptor file associated with the identified water installation device profile that needs to be used. The family descriptor file for each virtual descriptor file comprises a plurality of instructions (other instructions may also be comprised) such as:

the virtual descriptor file id 403*a*, 403*b* ("<virtual_driver id="i">");

the virtual descriptor file name 404*a*, 404*b* ("<driver_name>");

a product code id 405*a*, 405*b* ("<id_product_code>")

a manufacturer id 406*a*, 406*b* ("<manufacturer id>").

A software version reference 407*a*,407*b* ("<sw_version>") relating to the last version of the virtual descriptor file;

In the example of FIG. 4*a*, there are two virtual descriptor files (virtual drivers) available. For example, VirtualDriver0.xml may be a virtual descriptor file for a first profile (e.g. a pH profile) and VirtualDriver1.xml may be a virtual descriptor file for a second profile (e.g. an ORP profile). It is noted that in other examples further virtual descriptor files corresponding to other functionalities or combinations of functionalities may be available. For example, a further (third) virtual descriptor file may correspond to a third profile that may be a profile corresponding to the combination of functionalities pH and ORP.

The family descriptor file (or XML file) may further comprise various device attributes 410. i.e. all the necessary parameters to identify the device via Modbus, as illustrated in FIG. 4*b*. It may comprise an id product code list 411, i.e. a product code list for all the devices using the same driver. This list shall be checked by software control to identify the device while scanning the modbus network. The id product code list 411 may comprise one or more id product codes 412. Another device attribute may be a software version list 413. It may include all the supported software versions 414 for this driver. This list shall also be checked by software control to identify the device while scanning modbus network. Another device attribute may be a manufacturer list 415 with one or more manufacturer ids 416, i.e. identifiers for the device manufacturer. This id shall also be checked by software control to identify the device while scanning the modbus network. In the example of FIG. 4*b* the family descriptor file has one id product code, one software version and one manufacturer id.

FIG. 4*c* illustrates another part of the family descriptor file which includes the components tags. A components list 420 may be linked as a read or as a write function from outside. Depending on that, a modbus_read_function or a modbus_write_function may be used, accordingly. A component may comprise a component id 421, a component name 422, that may define that the device needs to execute a function. Then in tag 423, the function of the Modbus standard that needs to be used is defined. In tag 424, the address of the register that needs to be read with the function defined in tag 423 is defined. Finally, in tag 425, the mask (number of bits) to be read at the address defined in tag 424 is defined.

More specifically, after the tag 402 is read the water installation controlling apparatus needs to specify which virtual driver it will use. For that it needs to read, in step 325, the register of the water installation device as illustrated in FIG. 4*c*.

When the registry is read, it receives as a response the virtual driver id (the 2 last bits of the register in the example depicted in FIG. 4) that corresponds to the virtual device (with corresponding virtual driver) to be selected. For example, if the last two bits are 0 and 1, then this may correspond to a first profile (e.g. a pH profile). Then a first virtual descriptor file (e.g. VirtualDriver0.xml in FIG. 4*a*) may be selected. If the last two bits are 1 and 0 this may correspond to a second profile (e.g. an ORP profile). Then a second virtual descriptor file (VirtualDriver1.xml in FIG. 4*a*) may be selected. Finally, if the last two bits are 1 and 1 this may correspond to a third profile (e.g. a pH/ORP profile). Then a third virtual descriptor file may be selected.

It is noted that it is possible to point to as many virtual descriptor files as necessary, as a function of the registry that is read and the mask that is applied. This may refer to any change of behaviour that may be reflected in the final descriptor file.

Once the virtual descriptor file is identified, the appropriate virtual driver is selected and executed and the process may continue as described in the co-pending international application PCT/EP2014/079281 that relates to methods of controlling a water installation device by a water installation controlling apparatus by using a descriptor file.

As described above, the water installation controlling apparatus 220 may be configured to operate a plurality of water installation device types, protean or non-protean, through software (descriptor files) associated to each water installation device type. The descriptor files may be stored at the water installation controlling apparatus or at a remote server accessible by the water installation controlling apparatus via a secure communication network or link.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

Further, although the examples described with reference to the drawings comprise computing apparatus/systems and processes performed in computing apparatus/systems, the invention also extends to computer programs, particularly computer programs on or in a carrier, adapted for putting the system into practice.

The following clauses disclose in an unlimited way additional implementations, with each clause representing one or more implementations.

Clause 1. A method of operating a protean water installation device connected to a water installation controlling apparatus, the water installation device comprising two or more water installation device profiles, wherein only one of the water installation device profiles is enabled at any given time, the method comprising:

selecting a family descriptor file associated with the water installation device, said family descriptor file associated with two or more virtual descriptor files, each virtual descriptor file being associated with one water installation device profile of the water installation device;

reading the selected family descriptor file to identify at the water installation controlling apparatus a registry location indicating the enabled water installation device profile;

scanning the identified registry location to identify the enabled water installation device profile;

identifying the virtual descriptor file associated with the identified water installation device profile;

executing the identified virtual descriptor file to operate the water installation device.

Clause 2. The method according to clause 1, wherein selecting a family descriptor file further comprises identifying a tag indicating that the selected family descriptor file is associated with two or more virtual descriptor files.

Clause 3. The method according to clause 2, wherein reading the selected family descriptor file comprises executing a software component to identify the registry location of the protean water installation device.

Clause 4. The method according to clause 3, wherein identifying the enabled water installation device profile comprises identifying a manufacturer identification (ID) of the water installation device.

Clause 5. The method according to clause 3 or 4, wherein identifying the enabled water installation device profile comprises identifying a functional mode of the water installation device.

Clause 6. The method according to any of clauses 3 to 5, wherein identifying the enabled water installation device profile comprises identifying a version of the water installation device.

Clause 7. The method according to any of clauses 3 to 6, wherein executing the identified virtual descriptor file comprises applying a software mask associated with the identified water installation device profile.

Clause 8. The method according to any of clauses 1 to 7, further comprising requesting the identified virtual descriptor file from a remote data storage location.

Clause 9. The method according to any of clauses 1 to 7, wherein the family descriptor file comprises the virtual descriptor file and wherein identifying the virtual descriptor file associated with the identified water installation device profile comprises locating the virtual descriptor file within the family descriptor file.

Clause 10. The method according to any of clauses 1 to 9, wherein operating a water installation device connectable to a water installation controlling apparatus comprises operating a device connectable to a controlling apparatus of a water installation that is filled with water to enable swimming or other leisure activities.

Clause 11. The method according to clause 10, wherein the water installation device is a multidisciplinary device having at least two device profiles, wherein the first device profile is a pH controller profile and the second device profile is an Oxidation-Reduction Potential controller profile.

Clause 12. A water installation controlling apparatus to operate a water installation device connectable to the water installation controlling apparatus, the water installation device comprising two or more water installation device profiles, wherein only one of the water installation device profiles is enabled at any given time, the water installation controlling apparatus comprising:

means for selecting a family descriptor file associated with the water installation device, said family descriptor file associated with two or more virtual descriptor files, each virtual descriptor file being associated with one water installation device profile of the water installation device;

means for reading the selected family descriptor file to identify at the water installation controlling apparatus a registry location indicating the enabled water installation device profile;

means for scanning the identified registry location to identify the enabled water installation device profile;

computing/electronic means for identifying the virtual descriptor file associated with the identified water installation device profile;

means for executing the identified virtual descriptor file to operate the water installation device.

Clause 13. A water installation system comprising:

the water installation controlling apparatus according to clause 12; and the water installation device having two or more water installation device profiles wherein only one of the water installation device profiles is enabled at any given time, coupled to the water installation controlling apparatus.

Clause 14. The water installation system according to clause 13, further comprising a water installation that is filled with water to enable swimming or other leisure activities.

Clause 15. The water installation system according to clause 14, wherein the water installation is a swimming pool or the like.

Clause 16. The water installation system according to clause 14 or 15, wherein the water installation device is a multidisciplinary device having at least two device profiles, wherein the first device profile is a pH controller profile and the second device profile is an Oxidation-Reduction Potential controller profile.

Clause 17. A computer program product comprising program instructions for causing a computing system to perform a method according to any of clauses 1 to 11 of operating a water installation device.

Clause 18. A computer program product according to clause 17, embodied on a storage medium.

Clause 19. A computer program product according to clause 17, carried on a carrier signal.

Clause 20. A computing system comprising a memory and a processor, embodying instructions stored in the memory and executable by the processor, the instructions comprising functionality to execute a method according to any of clauses 1 to 11 of operating a water installation device.

What is claimed is:

1. A method of operating a water installation device connected to a water installation controlling apparatus, the water installation device comprising a first water installation device profile associated with a first functional mode of the water installation device and a second water installation device profile associated with a second functional mode of the water installation device that is different than the first functional mode, wherein only one of the first and second water installation device profiles is enabled at any given time, the method comprising:

selecting a family descriptor file associated with the water installation device, the family descriptor file associated with first and second virtual descriptor files that are respectively associated with the first and second water installation device profiles of the water installation device;

reading the selected family descriptor file to identify at the water installation controlling apparatus a registry location that is indicative of which of the first and second water installation device profiles is enabled;

scanning the identified registry location to identify which of the first and second water installation device profiles is enabled;

identifying the first virtual descriptor file or the second virtual descriptor file associated with the identified first or second water installation device profile;

executing the first virtual descriptor file or the second virtual descriptor identified in the preceding step to operate the water installation device.

2. The method according to claim 1, wherein selecting a family descriptor file further comprises identifying a tag indicating that the selected family descriptor file is associated with two or more virtual descriptor files.

3. The method according to claim 2, wherein reading the selected family descriptor file comprises executing a software component to identify the registry location of the water installation device.

4. The method according to claim 3, wherein identifying the enabled first or second water installation device profile comprises identifying a manufacturer identification of the water installation device.

5. The method according to claim 3, wherein identifying the enabled water installation device profile comprises identifying a version of the water installation device.

6. The method according to claim 3, wherein executing the identified first or second virtual descriptor file comprises applying a software mask associated with the identified water installation device profile.

7. The method according to claim 1, further comprising requesting the identified first or second virtual descriptor file from a data storage location remote from the water installation controlling apparatus.

8. The method according to claim 1, wherein the family descriptor file comprises the first and second virtual descriptor files and wherein identifying the first or second virtual descriptor file respectively associated with the identified first and second water installation device profile comprises locating the first or second virtual descriptor file within the family descriptor file.

9. The method according to claim 1, wherein operating a water installation device connectable to a water installation controlling apparatus comprises operating a device connectable to a controlling apparatus of a water installation that is filled with water.

10. The method according to claim 1, wherein the first functional mode is a pH controller and the second functional mode is an Oxidation-Reduction Potential controller.

11. A water installation controlling apparatus to operate a water installation device connectable to the water installation controlling apparatus, the water installation device comprising two or more water installation device profiles, wherein only one of the water installation device profiles is enabled at any given time, the water installation controlling apparatus comprising:
   means for selecting a family descriptor file associated with the water installation device, the family descriptor file associated with two or more virtual descriptor files, each of the two or more virtual descriptor files being associated with one water installation device profile of the water installation device;
   means for reading the selected family descriptor file to identify at the water installation controlling apparatus a registry location indicating the enabled water installation device profile;
   means for scanning the identified registry location to identify the enabled water installation device profile;
   means for identifying the virtual descriptor file associated with the identified water installation device profile;
   means for executing the identified virtual descriptor file to operate the water installation device.

12. A water installation system comprising:
   a water installation controlling apparatus to operate a water installation device connectable to the water installation controlling apparatus, the water installation device comprising two or more water installation device profiles, wherein only one of the water installation device profiles is enabled at any given time, the water installation controlling apparatus including:
   means for selecting a family descriptor file associated with the water installation device, the family descriptor file associated with two or more virtual descriptor files, each of the two or more virtual descriptor files being associated with one water installation device profile of the water installation device;
   means for reading the selected family descriptor file to identify at the water installation controlling apparatus a registry location indicating the enabled water installation device profile;
   means for scanning the identified registry location to identify the enabled water installation device profile;
   means for identifying the virtual descriptor file associated with the identified water installation device profile;
   means for executing the identified virtual descriptor file to operate the water installation device.

13. The water installation system according to claim 12, further comprising a water installation that is filled with water to enable swimming.

14. The water installation system according to claim 13, wherein the water installation is a swimming pool.

15. The water installation system according to claim 13, wherein the water installation device is a multidisciplinary device having at least two device profiles, wherein the first device profile is a pH controller profile and the second device profile is an Oxidation-Reduction Potential controller profile.

* * * * *